United States Patent [19]

Ruger

[11] Patent Number: 6,106,266
[45] Date of Patent: Aug. 22, 2000

[54] GEAR EXTRUDER FOR A CAOUTCHOUC MIXTURE

[75] Inventor: Wolfgang Ruger, Alfeld/Leine, Germany

[73] Assignee: Paul Troester Maschinenfabrik, Hannover, Germany

[21] Appl. No.: 08/883,884

[22] Filed: Jun. 27, 1997

[30] Foreign Application Priority Data

Jul. 5, 1996 [DE] Germany .............................. 196 27 081
Nov. 20, 1996 [DE] Germany .............................. 196 47 904

[51] Int. Cl.$^7$ ................................................... B29C 47/52
[52] U.S. Cl. ..................... 425/204; 366/76.5; 425/376.1; 425/461
[58] Field of Search ................................. 425/204, 376.1, 425/461; 366/76.5

[56] References Cited

U.S. PATENT DOCUMENTS

| | | |
|---|---|---|
| 68,101 | 8/1867 | Mills . |
| 4,247,272 | 1/1981 | Anders . |
| 4,269,582 | 5/1981 | Mella . |
| 4,445,835 | 5/1984 | Wasserbach . |
| 4,813,860 | 3/1989 | Jonsson et al. . |
| 5,855,927 | 1/1999 | Uth et al. . |

*Primary Examiner*—Harold Pyon
*Assistant Examiner*—Joseph Leyson
*Attorney, Agent, or Firm*—Lackenbach Siegel Marzullo Aronson & Greenspan, P.C.

[57] ABSTRACT

The invention relates to an extruder apparatus for the extrusion of caoutchouc mixtures and plastics, having a gear extruder consisting of a housing in which a pair of gears that mesh with one another, and two intake rollers, are housed, and there is also provided in the apparatus two intake channels and one extrusion channel. It is the task of the invention, by simple means, and in a simple manner, to improve material intake and to better fill the tooth spaces with the material to be extruded, and by doing so, to reduce inclusions of air that are brought along as well. The invention resides in the fact that one pushes in the material to be processed, as far as possible into the tooth spaces of the gears by means of the intake rollers, which are arranged at a point at which the teeth of the gears constitute, together with the inner wall of the housing, an intake slot, and in so doing, one expels, at least in part, the air that is situated in the tooth spaces. The extruder apparatus is distinguished by the fact that an intake roller is allotted directly to each gear and that the intake rollers are arranged in recesses of the housing at a point at which the teeth of the gears, together with the interior wall of the housing, constitute an intake slot. In this way, it is possible to fill the gear spaces to a more perfect degree with the material to be extruded, and to avoid, in large measure, the inclusion of air.

11 Claims, 5 Drawing Sheets

GEAR EXTRUDER FOR A CAOUTCHOUC MIXTURE

The invention relates to an extruder apparatus for the extrusion of caoutchouc mixtures and plastics having a gear extruder consisting of a housing in which a pair of gears that mesh with one another in the nature of a gear pump is housed, and which is equipped with an intake channel and an extrusion channel and to which two intake rollers are allotted.

The Background of the Invention gear extruder that can be used for this purpose has become known from DE 345 406 [a German patent]. This gear extruder consists of dual pairs of gears arranged on the same shafts. Each of these pairs of gears is supplied with a single strand of material, which is pressed into the intake channel by a pair of intake rollers arranged on the outside of the housing, and it is divided into two composite strands, which are led individually to each of the two gears of each pair of gears, by a blade-shaped strand divider.

Although this printed publication is very old, the process described in it and the gear extruder that is used for the purpose of performing the process, have found only little acceptance in extrusion technology. Instead of the extrusion technology described in this printed publication, screw-type extruders are used for extrusion almost exclusively, even though the latter have a considerably higher price of acquisition, and even though, in operation, they exhibit many a disadvantage that does not appear in the case of gear extruders. At this juncture, one might just mention the longer sojourn of the material to be extruded in the screw-type extruder, the resultant greater degree of heating of the material to be extruded that occurs within the screw-type extruder, and the pulsation, which cannot be avoided altogether.

In spite of these disadvantages of screw-type extruders, gear extruders for the extrusion of caoutchouc mixtures and plastics that have not been melted open (in contrast to plastics that have been rendered fluid by having been melted), have not, thus far, been able to prevail in technology, because gear extruders, too, thus far, have been fraught with considerable, and probably even more serious, disadvantages than screw-type extruders, disadvantages one has been unable to eliminate, even in the course of more than seven decades of continual development in production technology in the field.

One of these disadvantages occurs in the feeding, which could not be improved by means of a pair of intake rollers arranged on the external side of the housing; another occurs in the form of inclusions of gas or air in the extrudate. Technically, the causes for these disadvantages are linked to one another. The rubbing of the material to be extruded on the internal housing wall, in and ahead of the intake slit of each of the gears is one of the causes for the intake difficulties; in addition to the latter, the imperfect intake is, at the same time, an additional cause for inclusions of air at the base of the tooth space. These inclusions of air then occur, to some degree, as hollow spaces in the extrudate.

In the case of DE 345 406, in order to improve intake, provision is made, ahead of the intake channel into the housing, for the aforementioned pair of intake rollers, as an aid to intake that presses the material to be extruded into the intake channel. With this pair of intake rollers, it is possible to split up the strip of material, which is introduced as a single strip, into the requisite two material strips, and to fill the space ahead of the gears with material to be extruded, and to subject it to pressure, but not to decrease the friction in the intake slit between the gear and the interior wall of the housing. As a result, inclusions of air can be avoided only to a flawed degree as well.

BRIEF SUMMARY OF THE INVENTION

The invention avoids the disadvantages of the state of the art. It is the task of the invention, using simple means, and in a simple manner, to improve the intake of material, and to fill the tooth spaces with the material to be extruded to a better degree, and in this way, to decrease the dragging along of inclusions of air.

The invention consists of the fact that an intake channel is allotted to each gear, and that the material to be processed is pressed into the tooth spaces of the gears by means of the intake rollers that are allotted to each gear and are arranged tightly next to the gear and ahead of that point at which the teeth of the gears run along the inner wall of the housing, thus expressing the air that is located within the tooth spaces, and improving the degree of filling.

To undertake this process, the gear extruder according to the invention can be used, which is distinguished by the fact that an intake roller is directly allotted to each gear and is arranged tightly next to this gear, and that the intake rollers are arranged ahead of that point at which the teeth of the gears run along the inner wall of the housing.

In the case of the present gear extruder, it is of particular advantage if the surfaces of the intake rollers are smooth or slightly roughened. For then the intake rollers can completely fill the gears' tooth spaces, which would not be possible if the intake rollers bore teeth as well.

Furthermore, in the case of the present gear extruder, it is advantageous if a stripper, which prevents repeated dragging of the material to be extruded, lies against the surface of the intake rollers, thus assuring that the duration of sojourn within the extruder is just short and equally long for all material parts to be extruded.

In many instances, the intake rollers do not require any separate drive, that is, for the purpose of processing certain caoutchouc mixtures or plastics. A separate drive for the intake rollers, which is necessary for the processing of certain mixtures, has advantages, however, even in those instances in which it is not necessary, because as a result of such a drive, it is possible to achieve the formation of a swelling of the material to be processed ahead of the point of intake, which leads to better mixing of the material to be processed, even before it is drawn within the tooth spaces, and it gives rise to an important pre-softening stage, which is important for progress of the process, as a result of which the tooth spaces are more readily filled as well.

In the process, it can be to good purpose if the intake rollers are arranged in recesses in the housing.

The term direct allocation is here understood to mean that the intake rollers are arranged in the immediate proximity of the gears allocated to them.

Whereas, in the case of DE 345 406, the pair of intake rollers presses a single strip of material into the intake channel and divides it into two component strands by means of the blade-shaped strand divider, said strands being conducted individually to each of the two gears, the pair of intake rollers thus constituting an aggregate in its own right, in the case of the invention, as a result of the immediate allocation of each of the two intake rollers to one of the two gears, in each case, it is accomplished that the intake rollers press the material to be extruded directly into the tooth spaces, thus filling the latter more perfectly. In this process, in each case, a gear and a feeding roller work together in combination. In this way, it is possible, in a simple manner, to fill the tooth spaces better with material to be extruded, and to reduce the additional intake of air. In this collaboration between feeding roller and gear, a swelling is formed, similar in form to the one that is known ahead of a calender slot. As a result of this swelling formation, a pre-softening is achieved, which also leads to a better filling of the tooth spaces. The formation of the swelling is mixture-dependent, but it can be influenced by shifting the position of the intake roller.

The intake roller pair of the gear extruder of DE 345 406, which collaborates as a pair, thus serves merely to split the single input material strip into two constituent strips, and to fill the intake channel. Each of the two intake rollers, which work individually in conjunction with the allotted gear, serves to fill the tooth spaces, which cannot be accomplished with the intake roller pair of the gear extruder of DE 345 406.

The higher degree of filling of the tooth spaces that is achieved in this way increases productivity. This possibility of improved filling of the tooth spaces also renders increased working speed possible by virtue of higher rates of revolution.

In the case of this gear extruder, it is advantageous if the bearings of the intake rollers may have their positions shifted by means of position adjusters, in order to alter the intake opening.

In this case, the means of adjustment may be adjustment screws, for example, motor-driven spindles, or piston-cylinder units, if necessary, in combination with springs.

This gear extruder according to the invention can be used not only for the processing of caoutchouc mixture strips, but also for caoutchouc pellets, or plastic granulate if a granulate-feeding device is arranged on the housing's intake opening. Even caoutchouc snippets of the smallest dimensions, or plastic pellets can be processed with this gear extruder.

In the process, the intake apparatus can be a channel that is equipped with a blower, and/or a funnel, preferably one equipped with a mixer or other feeding aids, that is arranged on the housing.

In order to prevent the material that is being drawn in from running around with the intake roller, it can be advantageous for a scraper to engage the surface of the intake rollers.

The gear extruder can also be structured in such a way that the intake rollers are situated in separate portions of the housing, which are applied to the housing at points at which openings in the housing are situated, through which the intake rollers pass and engage. That yields the advantage that as a result of the dismantling of the separate portion of the housing, access to the point at which the strip is drawn in by the gear and pressed into the teeth is possible in a particularly rapid and easy fashion. Even in the case of intake rollers with a separate drive, this structural form is advantageous, because disruptions can be eliminated by a more rapid exchange of the separate portion of the housing.

DETAILED DESCRIPTION OF THE INVENTION

The gear extruder for the extrusion of caoutchouc mixtures and plastics consists of a housing, 1, in which a pair of gears that mesh with one another, 2, and two intake rollers, 3, are housed, and which is equipped with two intake channels, 4, and an extrusion channel, 5. The intake rollers, 3, are arranged in recesses, 6, of the housing, 1, at a point at which the teeth of the gears, 2, as they circulate, constitute, with the interior wall of the housing, 7, an intake opening.

Figure 1:
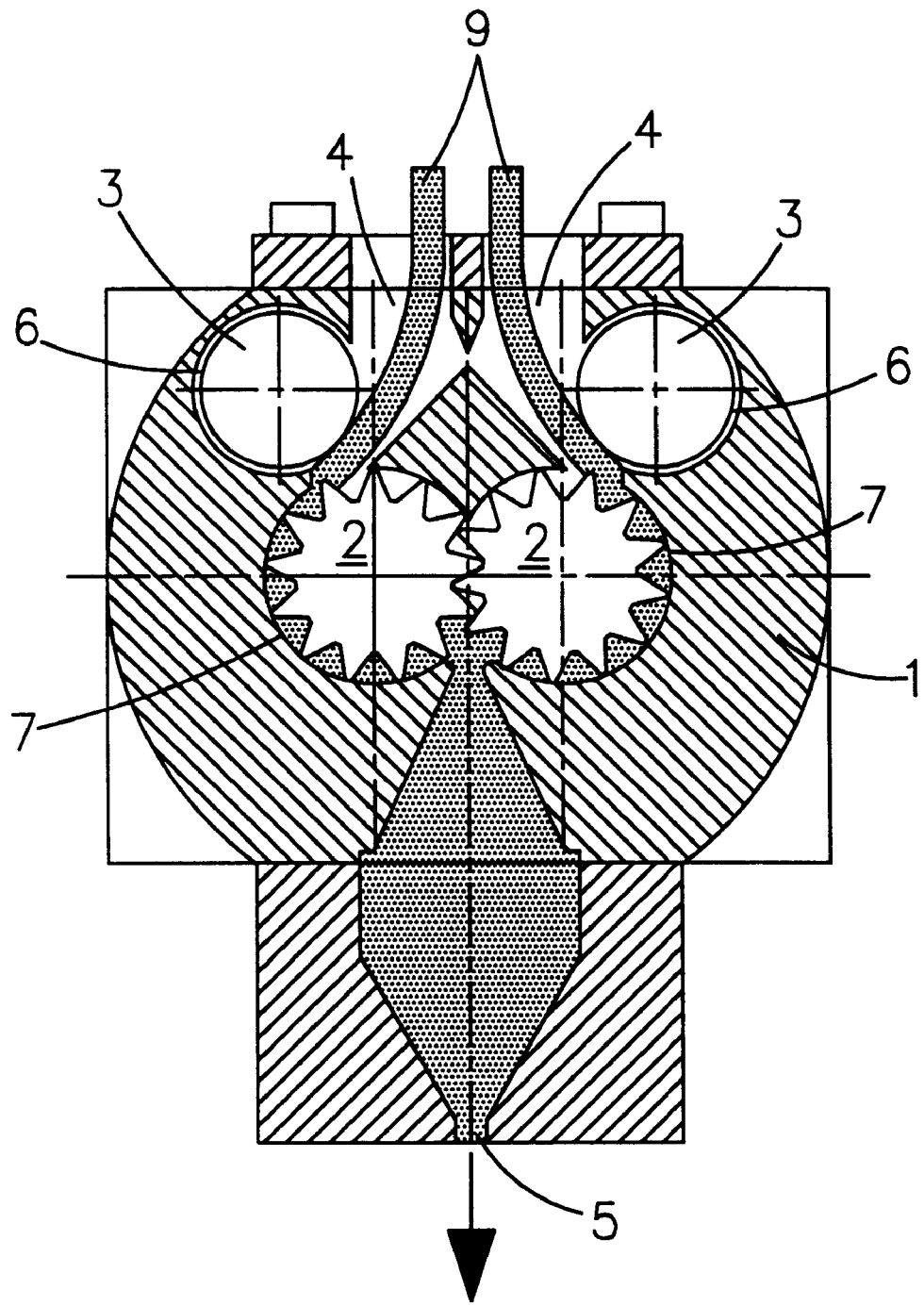
FIG. 1 shows a section through a gear extruder that is supplied with strips of a caoutchouc mixture.
Figure 2:
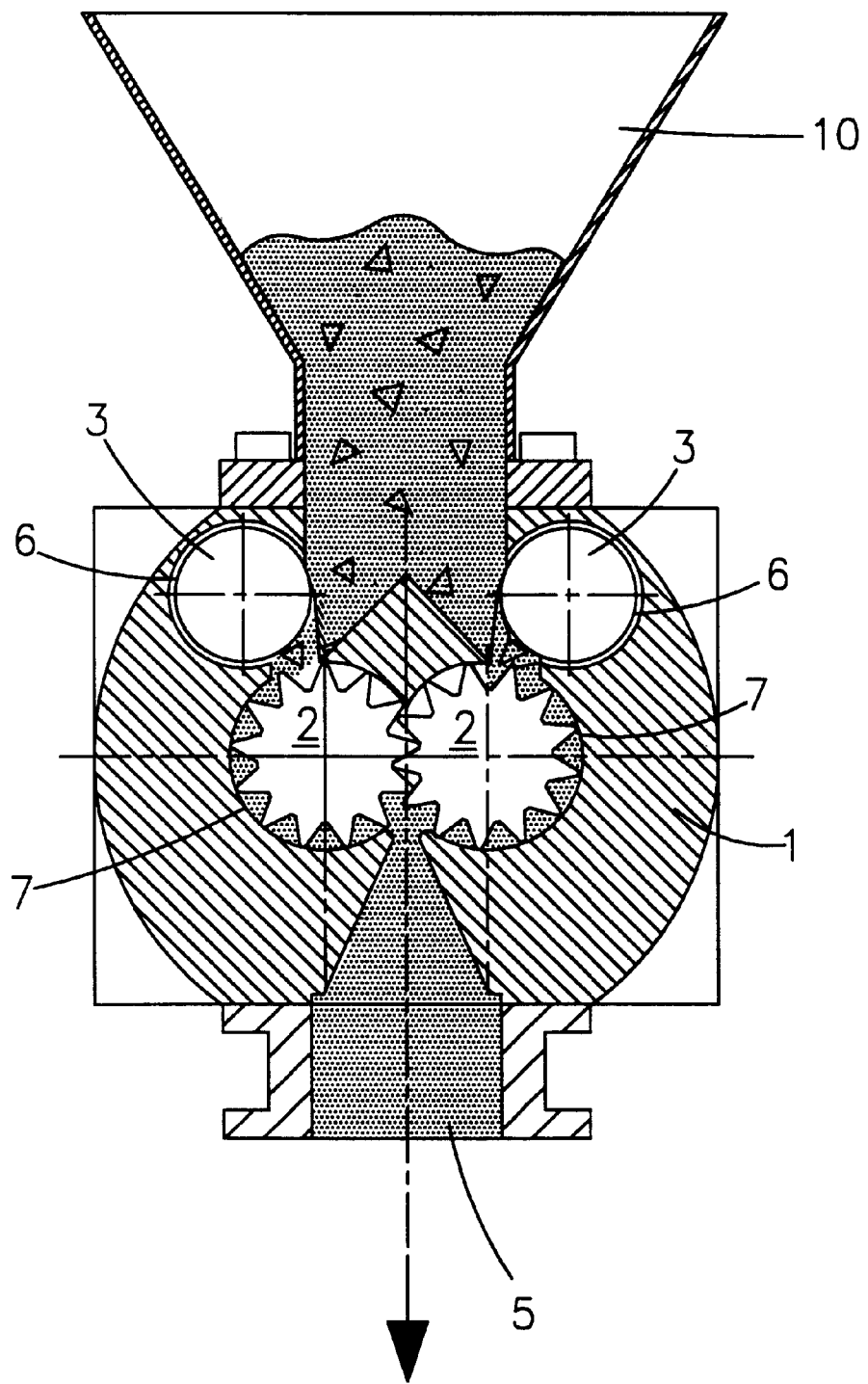
FIG. 2 shows a section through a gear extruder that is supplied with caoutchouc pellets or plastic granulate.

In the embodiment example of FIG. 1, caoutchouc strips, 9, are drawn into the gear extruder. In the embodiment example of FIG. 2, a granulate intake device in the form of a funnel, 10, is arranged atop the input opening of housing 1.

Figure 3:
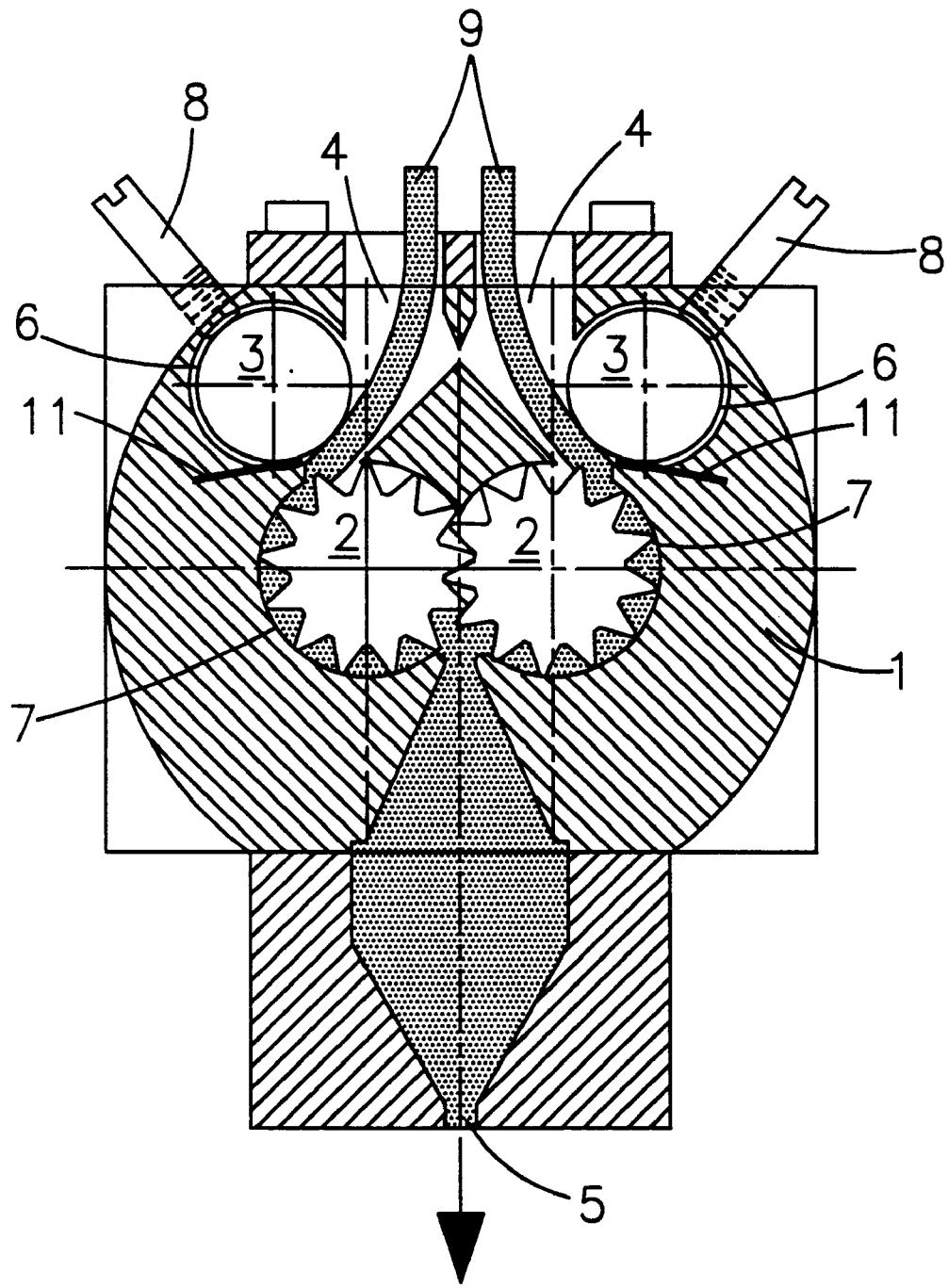
FIG. 3 shows a section through a gear extruder, the position of whose intake rollers may be shifted by positioning equipment in combination with springs, and they are cleaned by means of scrapers.

It is to good purpose if the bearings of the intake rollers, 3, are situated such that their position may be shifted, and that they may be shifted by some means of position adjustment, such as adjustment screws, 8, as shown in FIG. 3.

In the processing of sticky material, it can be to good purpose if a scraper, 11, engages at the surface of intake roller 3, as is also shown in FIG. 3.

An opportunity to provide independent tempering of housing, gears, and intake rollers is to good purpose and advantageous in the case of materials that are difficult to process.

Figure 4:
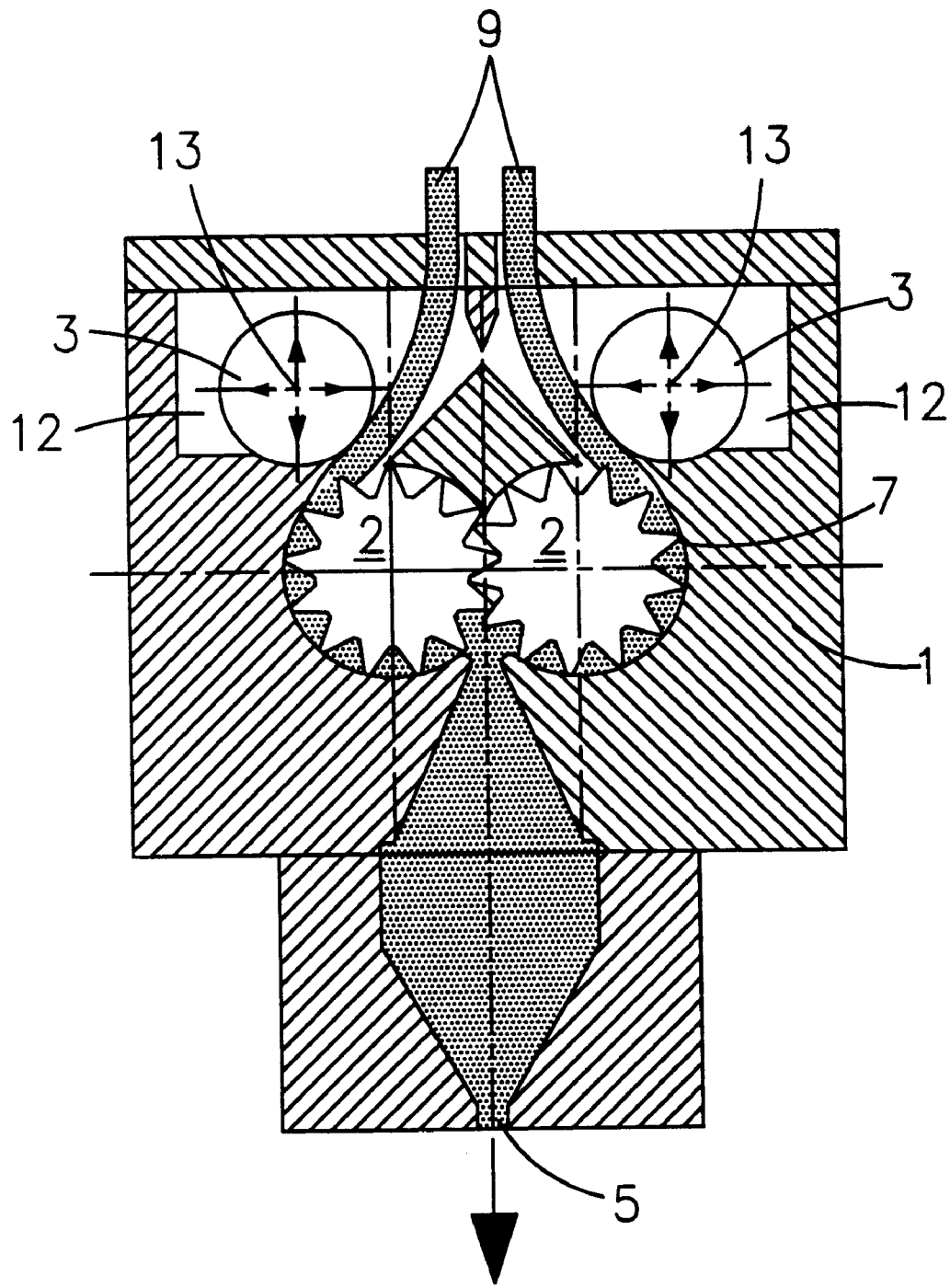
FIG. 4 shows a section through another gear extruder with freely arranged intake rollers.

In the embodiment example of FIG. 4, the intake rollers, 3, are arranged in the upper portion of the hollow space 12; their position may be shifted in the direction indicated by the arrows, 13. They press the strips, 9, into the tooth spaces of the gears, 2.

The tooth spaces that are filled with the material of the strips, 9, move through free space into the recess of housing 1, which accepts, in each case, gear 2. On the surface, 7, of this recess in the housing, only little friction occurs initially, as a result of which the resistance that is due to friction, which is reduced in any case as a result of the intake rollers, 3, which work in combination with the gears, 2, is reduced even further.

Figure 5:
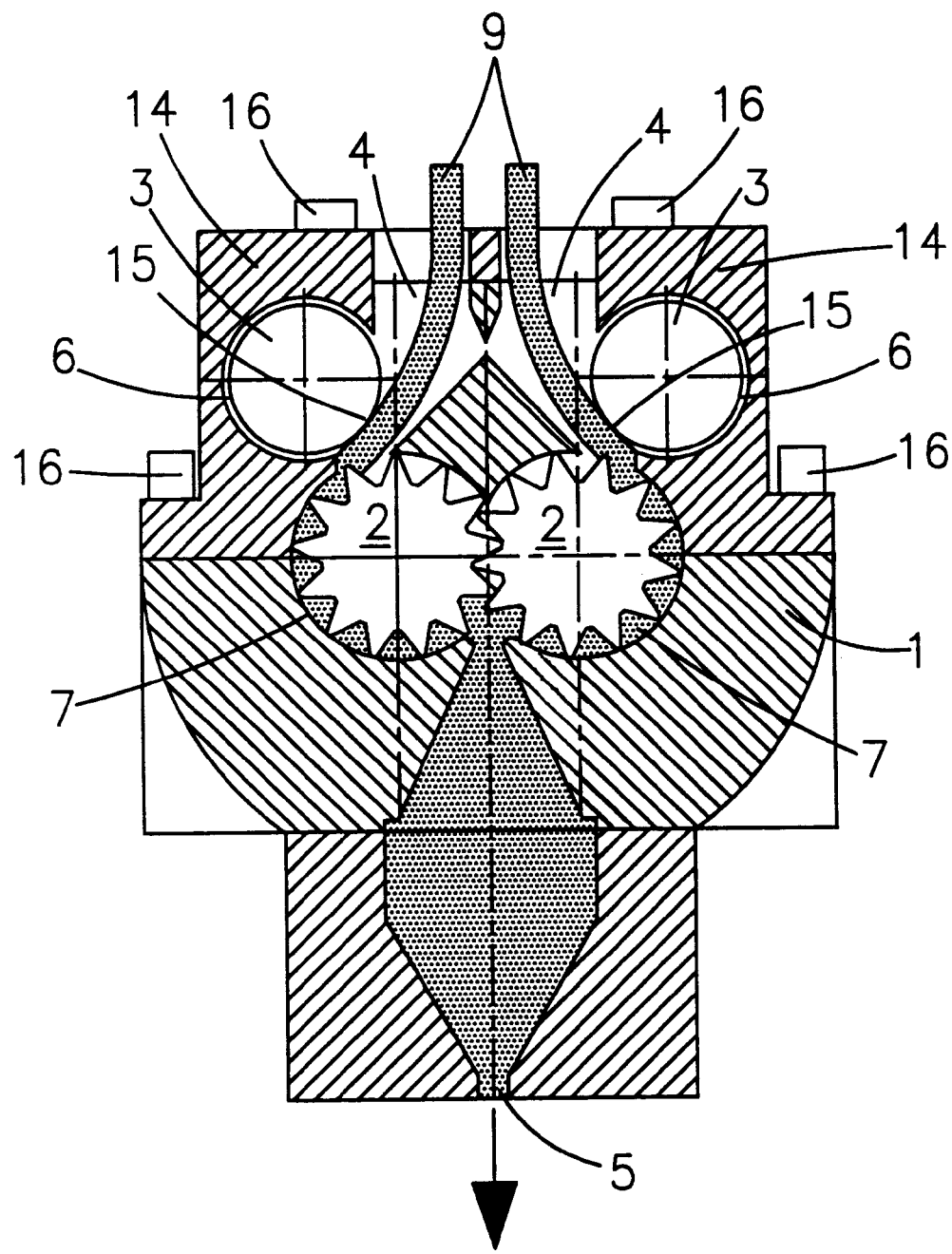
FIG. 5 shows a section through an embodiment form of the extruder in which the intake rollers are situated in separate portions of the housing and they engage through recesses in the housing.

In the case of the gear extruder of FIG. 5, the intake rollers, 3, are arranged in the recesses, 6 of the housing, 1, and are located in separate housing parts, 14, which are applied to the housing, 1, at points at which openings, 15, are located in housing 1, through which the intake rollers 3 pass and engage. These separate housing parts, 14, are attached to housing 1 by means of attachment fittings, 16.

What is claimed is:

1. A gear extruder for the extrusion of a caoutchouc mixture or plastic granulate/materials, comprising:

a housing having an entry opening and an interior wall in which a pair of driven gears, each with teeth and teeth spaces, that mesh with each other are housed, said extruder being equipped with an extrusion channel and two intake channels to which two separate intake feeding rollers are allotted, characterized by the fact that each intake roller with its roller surface is directly allotted and is arranged next to one of said gears for separately feeding the same, and that said intake rollers are arranged in separate recesses of said housing, each intake roller being ahead of a point at which the teeth of said respective gear runs along the interior wall of the housing, so that separate streams of material are fed to said extrusion channel, whereby said intake rollers force the extruded material to more completely fill and pack into the teeth spaces between said gear teeth to minimize inclusion of air and maximize material outflow from said gear extruder.

2. A gear extruder according to claim 1, characterized by the fact that the intake rollers (3) are situated in separate housing parts (14) which are applied to the housing (1) at points at which openings (15) are located in the housing (1), through which the intake rollers pass and are rotatably mounted.

3. A gear extruder according to claim 1, characterized by the fact that the intake rollers (3) are provided with bearings.

4. A gear extruder according to claim 1, characterized by the fact that a granulate intake device is provided at the entry opening of the housing (1).

5. A gear extruder according to claim 1, characterized by the fact that the intake rollers (3) are equipped with a separate drive apparatus.

6. A gear extruder according to claim 1, characterized by the fact that the intake rollers (3) are smooth or slightly roughened.

7. A gear extruder according to claim 1, characterized by the fact that a scraper lies against surfaces of said intake rollers (3), and between each said roller and each of the two gears.

8. A gear extruder according to claim 3, wherein said bearings are repositionable.

9. A gear extruder according to claim 1, wherein said intake rollers are shiftable by means of adjustment screws.

10. A gear extruder according to claim 9, wherein said intake rollers are shiftable along a pair of axes which are orthogonal to each other.

11. A gear extruder according to claim 1, wherein said material is supplied to said gear extruder by means of a funnel shaped hopper.

* * * * *